UNITED STATES PATENT OFFICE.

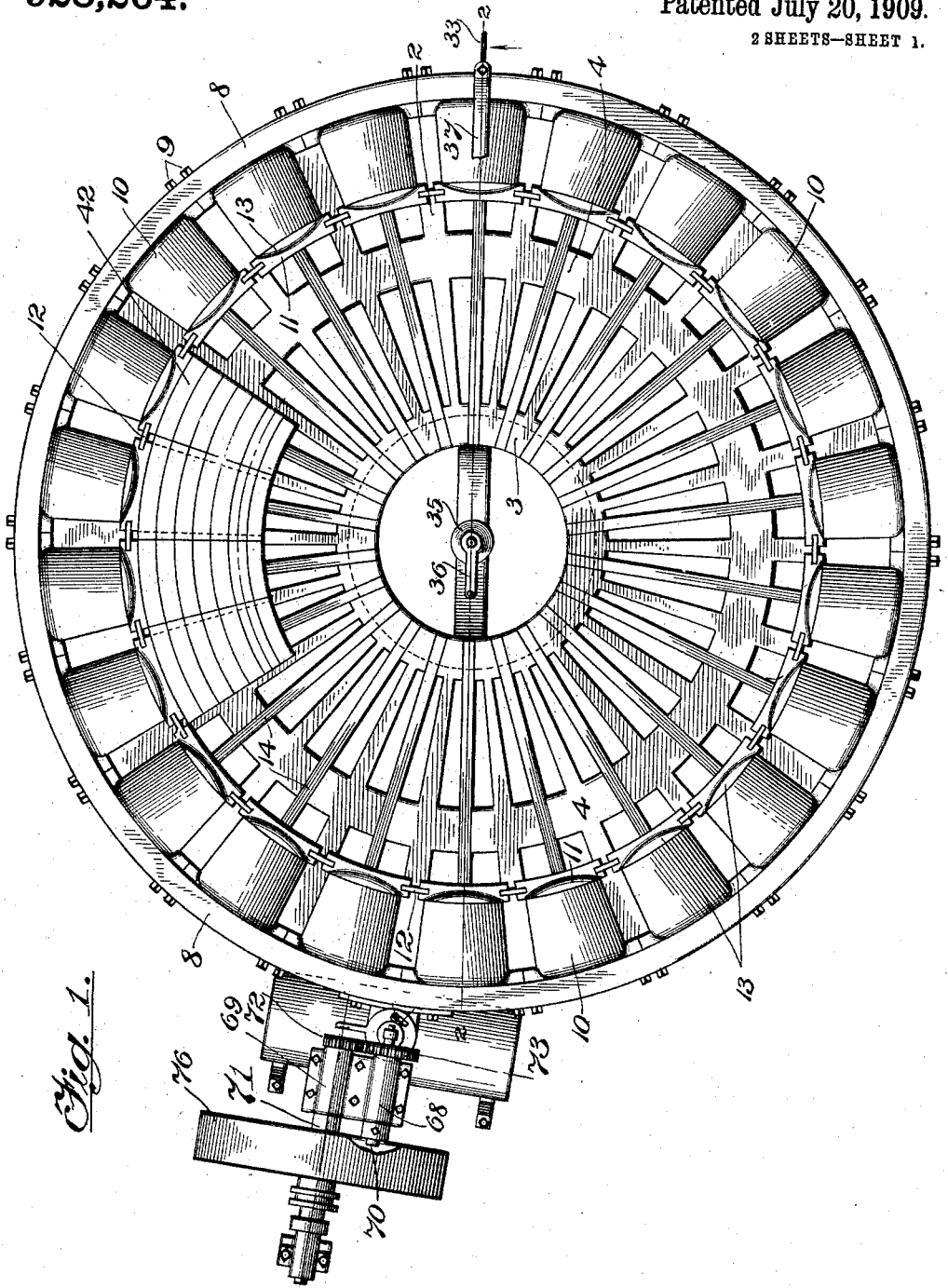

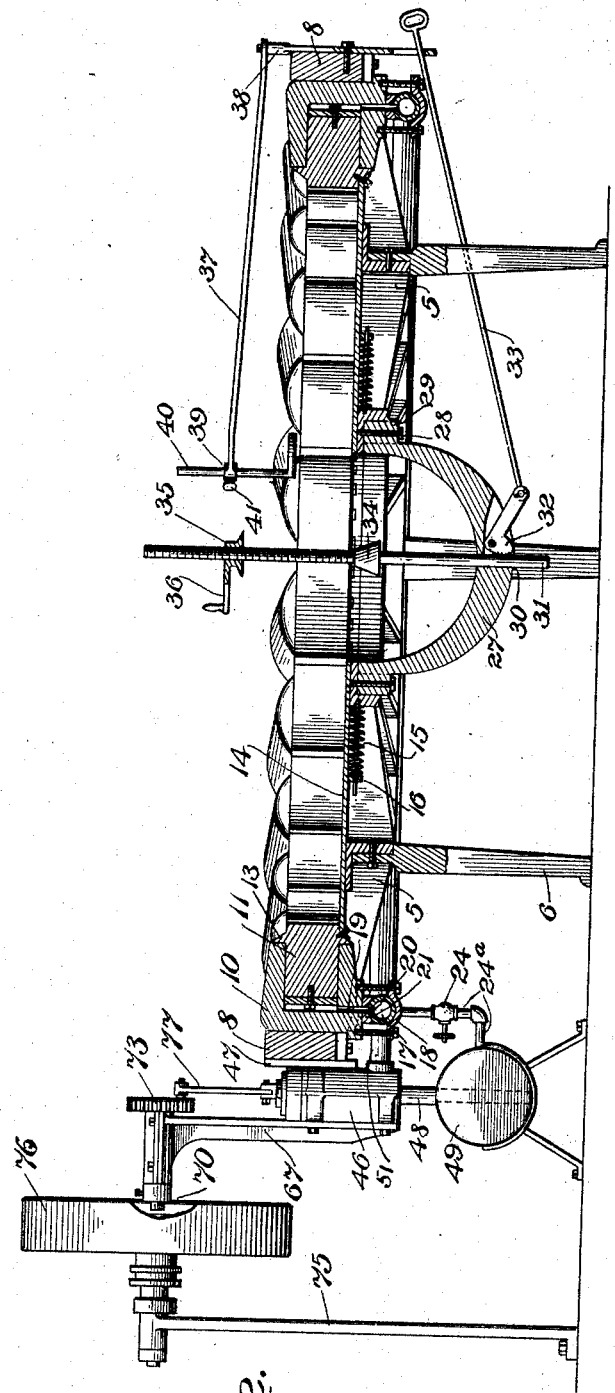

HERBERT M. LOURIE, JOHN W. DEVERO, AND JOHN C. FORD, OF KEOKUK, IOWA, ASSIGNORS TO NATIONAL MACHINE COMPANY, OF KEOKUK, IOWA, A CORPORATION OF IOWA.

TIRE-SETTER.

No. 928,264.      Specification of Letters Patent.      Patented July 20, 1909.

Application filed January 7, 1904. Serial No. 188,076.

*To all whom it may concern:*

Be it known that we, HERBERT M. LOURIE, JOHN W. DEVERO, and JOHN C. FORD, citizens of the United States, residing at Keokuk, in the county of Lee and State of Iowa, have invented a certain new and useful Improvement in Tire-Setters, of which the following is a full, clear, concise, and exact description, reference being had to the accompanying drawing, forming a part of this specification.

Our invention relates to improvements in tire setting machines, and more particularly to that class of machines known as hydrostatic tire setters.

It has for its object to provide a machine for setting tires cold by means of fluid pressure, and to provide a machine which shall be simple and positive in operation, which exerts a great pressure upon the tire, and which can be manufactured at a reduced cost.

We have shown the preferred embodiment of our invention in the accompanying drawings, in which:

Figure 1 is a plan view of our tire setter; and Fig. 2 is a transverse section taken on the line 2—2 of Fig. 1.

In the construction which we have worked out as the most practical form of our invention, we provide a circular bed plate or spider, preferably made of cast iron and formed with radial arms 2 which are cast integral with a central ring 3 and an intermediate supporting ring 4. Suitable ribs 5 are formed upon the underside of the radial arms 2 to more firmly brace the bed plate, and secured to these ribs by bolts or other means are four legs 6, which support the machine. The radial arms 2 support at their outer ends a continuous ring 8 preferably formed of steel and securely fastened upon the arms by screws 9 passing through the same and screwing into the bottom of the ring.

Within the ring 8 is arranged in a circle, a series of similar pressing cylinders 10 fastened in position by screws passing through the ring 8 and into lugs formed on the cylinders. Operating within these cylinders is arranged a series of converging pistons 11 operated by means of the pressure of some fluid such as oil behind them to move them against the tire to be set upon the wheel. Hydraulic washers or packings are secured to the inner end of the pistons by screws to prevent leakage.

In order that the pistons may push toward the center uniformly or in a perfect circle for the purpose of rounding or truing up the wheels, they are connected by forming vertical slots in their front ends and inserting into the adjacent grooves metal keys 12 as shown in Fig. 1. The pistons when connected in this manner form a continuous ring and no piston will move toward the center faster than the rest. Shoulders 13 are formed upon the outer ends of the pistons which prevent them from moving too far into the cylinders and closing the ports which admit the impelling fluid to the cylinders.

To the front end of each piston on its underside is attached by means of suitable screws, a bar 14 which extends to the inner ring 3 and slides in suitable slots therein to guide the piston. The guide bars 14 are also used in returning the pistons 11 back to place, a coiled spring 15 being placed underneath the guide bar to operate against a depending lug 16 formed thereon and against the inner portion 3 of the bed plate.

A service pipe 17 for supplying each cylinder with fluid is secured in a position beneath the cylinders and beneath the bed plate by straps 18 secured to the underside of the cylinders at suitable intervals on the service pipe. To register with the ports 19 formed at the rear end in the underside of the cylinders, ports 20 are formed in the service pipe and between the pipe and each cylinder a washer 21 is placed in order to secure a perfect joint. This washer has a concave bottom to fit over the service pipe and is made flat on top to fit the bottom of the cylinder, the opening through the washer being made larger than the ports in the cylinder and service pipe to allow for slight variations in adjustment. While we preferably use a washer of this character, the service pipe may be secured tightly against the bottom of the cylinder with suitable packing interposed therebetween. The service pipe is bent in a true circle to conform to the arrangement of the cylinders. The service pipe is connected with a pump for filling the same, and is provided with a suitable outlet valve 24 to allow the operating fluid to escape after the tire has been set. The outlet valve 24 is preferably connected by a pipe 24[a] with the tank containing the impelling fluid in order that after the tire is set the fluid may be discharged into the tank and used again.

Extending across the central opening of the bed plate is an arch 27 bowed downwardly sufficiently to accommodate the hub of a wheel and secured to the under side of the bed plate by screws 28 passing through lugs 29 and screwing into the bed plate. A central opening 30 is formed in the center of the arch through which projects the lower end of a standard or rod 31 which is adapted to be secured in position by an eccentric jaw 32 pivoted to the arch, and adapted to normally clamp the standard. A rod 33 is secured to the outer end of the jaw and extends upwardly and outwardly to a position to be conveniently grasped by the operator. A centering cone or hub support 34 is secured upon the standard at a point intermediate of its ends and the upper end of the standard is threaded to receive a nut 35 having a crank 36 by means of which it may be tightened or loosened or disengaged to permit the application of the wheel. In order to enable the dish of the wheel to be readily determined, a gage bar 37 is provided and is pivoted upon a suitable support 38 secured to the outer periphery of the ring 8 which support also serves at its lower end as a support for the rod 33. On the inner end of the gage bar is formed an eye 39 through which the vertical stem of an L-shaped gage 40 passes, a screw 41 being provided to hold the stem in position.

To adapt the machine to wheels of smaller size, segmental presser blocks 42 are provided which are adapted to be interposed between the pistons 11 and the tire of the wheel to occupy the space between them and to transfer the force or pressure of the plungers to the tire.

A pump cylinder 46 having a plate 47 which is bolted to the ring 8 is connected at its lower end by means of a pipe 48 with a tank or reservoir 49 adapted to contain oil, water, or any other desired fluid which is forced under pressure into the pipe 17 and thence through the ports 19 and 20 to actuate the pistons 11. A check valve located in in the bottom portion of the pump cylinder is adapted to permit the flow of fluid from the reservoir into the cylinder and close upon the downward stroke of the piston to prevent the fluid from flowing back from the cylinder to the reservoir. The cylinder 46 is also connected with the service pipe 17, through a pipe 51 and a spring pressed valve is arranged in said pipe to allow the fluid to flow into the service pipe, but closes as soon as the piston reaches the limit of its downward stroke and thereby prevents the fluid from flowing back into the cylinder from the service pipe.

A bracket 67 is secured upon the pump cylinder and has at its upper end journal boxes 68 and 69 adapted to receive the shafts 70 and 71 of the intermeshing gear wheels 72 and 73. The shaft 71 is supported at its outer end by a stand 75 having a journal at its upper end, and is driven by a pulley 76 mounted thereon. The gear wheel 73 is driven by the gear wheel 72 and is connected with and reciprocates the piston 54 by a pitman 77.

In operation, the wheel is placed upon the frame the standard 30 passing through the hub and the hub resting upon the centering cone 34. The nut 35 is then tightened to hold the wheel in place, and the dish gage set. The pump is started and the fluid is forced from the tank 49 into the service pipe 17 and thence into the cylinders through the ports 20 and 19, forcing the pistons inwardly. After the operation of setting the tire is completed, the oil is allowed to exhaust from cylinders and service pipe back into the tank or reservoir through the exhaust pipe 24$^a$ which is connected with the controlling valve 24, which cuts off communication between the service pipe and tank. The springs 15 then operate to move the pistons back into their normal positions.

Having described our invention what we claim as new and desire to secure by Letters Patent is:

The combination with a frame or bed, of cylinders mounted upon said frame, pistons movable in said cylinders having vertical slots in their outer ends, and keys fitting in said slots for connecting said pistons together.

In witness whereof, we have hereunto subscribed our names in the presence of two witnesses.

HERBERT M. LOURIE.
    JOHN W. DEVERO.
    JOHN C. FORD.

Witnesses:
 OLIVER D. WALKER,
 MARGARET C. KEPPEL.